United States Patent Office 3,720,750
Patented Mar. 13, 1973

3,720,750
SELECTIVE RECOVERY OF COBALT FROM AN AMMONIACAL CARBONATE SOLUTION CONTAINING COBALT AND NICKEL

Tadeusz Karol Wiewiorowski, New Orleans, and David James Miller, Gretna, La., assignors to Freeport Minerals Company, New York, N.Y.
No Drawing. Continuation-in-part of application Ser. No. 143,267, May 13, 1971. This application Oct. 19, 1971, Ser. No. 190,636
Int. Cl. C01g 51/00, 53/00
U.S. Cl. 423—150    12 Claims

ABSTRACT OF THE DISCLOSURE

When cobalt is precipitated from ammoniacal carbonate solutions containing both cobalt and nickel by addition of a sulfiding agent to the solution, the amount of nickel co-precipitated with the cobalt is substantially reduced if, after addition of the sulfiding agent, the solution is treated with an oxygen-containing gas. This produces a two-fold desirable result: a precipitate enriched in cobalt and a mother liquor enriched in nickel.

The precipitate is further enriched in cobalt by first thickening the slurry containing the precipitate and then treating the thickened slurry with an oxygen-containing gas. This treatment solubilizes some of the nickel sulfide in the liquid phase of the slurry serving to simultaneously increase the cobalt content of the precipitate and the nickel content of the mother liquor.

CROSS REFERENCE TO RELATED APPLICATIONS

This application is a continuation-in-part of copending application Ser. No. 143,267, filed May 13, 1971.

BACKGROUND OF THE INVENTION

In commercial mineral processing, aqueous ammoniacal carbonate solutions containing dissolved cobalt and nickel are produced by heating an ore containing oxides of cobalt and nickel in a furnace with a reductant and then leaching the reduced ore, in the presence of air, with an aqueous solution of ammonium hydroxide and ammonium carbonate. Since it is commercially desirable to separate the cobalt from the nickel, separation processes have been developed. In one known process, the ammoniacal solutions containing cobalt and nickel are treated with a sulfiding agent, the objective being to precipitate the cobalt as cobalt sulfide while leaving the nickel dissolved in the mother liquor. Unfortunately, however, substantial amounts of nickel sulfide ordinarily co-precipitate with the cobalt sulfide. This is undesirable because the proportion of cobalt in the precipitate is diminished thus making recovery of the cobalt more difficult; moreover, the mother liquor, which is the source of recovered nickel values, has had its nickel content substantially diminished by the co-precipitation of nickel sulfide with the cobalt sulfide. It is apparent, therefore, that a method for retaining as much nickel as possible dissolved in the ammoniacal carbonate solution during the sulfiding operation would be most desirable. It is also apparent that a method for enriching the cobalt content of the precipitate, after it is formed in the sulfiding operation, by selectively redissolving the nickel sulfide in the mother liquor would be most desirable. Insofar as is known to applicants, no such methods have yet been provided by the prior art.

It is, therefore, an object of this invention to provide a method for separating cobalt from the nickel dissolved in an aqueous ammoniacal carbonate solution, using a sulfiding treatment, by which co-precipitation of nickel sulfide with the cobalt sulfide is minimized, thereby retaining more nickel in the mother liquor and producing a precipitate of enriched cobalt content.

It is another object of this invention to provide a method for selectively redissolving nickel sulfide present in the precipitate from the sulfiding treatment, in the ammoniacal carbonate mother liquor, to produce a precipitate further enriched in cobalt and a mother liquor further enriched in nickel.

It is another object of this invention to reduce the volume of the treated material in the case where the nickel values are selectively redissolved from the precipitate.

These and other objects of this invention will be apparent to one skilled in the art from a consideration of this entire disclosure.

SUMMARY OF THE INVENTION

In accordance with this invention, the above objectives are accomplished by treating the ammoniacal carbonate solution with an oxygen-containing gas after addition of the sulfiding agent to the solution. It has been found that such gas treatment has the surprising effect of significantly arresting the degree of nickel sulfide which co-precipitates with the cobalt sulfide. The result is that the precipitate is substantially enriched in cobalt values and substantially depleted in nickel values since more nickel has been retained in the mother liquor where it is desired. The gas treatment of this invention has produced precipitates containing up to about 30% more cobalt and about 30% less nickel than those produced by conventional processing, i.e. without the gas treatment of this invention.

The sulfiding treatment produces a slurry of low solids content in which the solid phase is the mixed nickel sulfide-cobalt sulfide precipitate. This slurry is thickened to increase its solids content and reduce the volume of material for subsequent processing. The thickened slurry is then treated with an oxygen-containing gas which causes nickel sulfide in the precipitate to selectively redissolve in the mother liquor. The result is a precipitate enriched in cobalt and a mother liquor enriched in nickel. This post-precipitation gas treatment has produced precipitates containing up to about 63% more cobalt and 17% less nickel than untreated precipitates. It has increased the nickel content of the mother liquor by as much as about 66% as compared to untreated mother liquors.

DESCRIPTION OF THE PREFERRED EMBODIMENTS

Selective precipitation of cobalt sulfide

The ammoniacal carbonate solution containing dissolved nickel and cobalt is treated with the oxygen-containing gas at any time after addition of sulfiding agent to the solution. Generally, such treatment should occur within about 60 minutes after addition of the sulfiding agent is completed and preferably within about 2 to 30 minutes after said addition is completed.

The amount of oxygen-containing gas used can vary considerably and need only be an amount effective to enhance the selective precipitation of cobalt sulfide. Generally, however, the amount of gas used should be sufficient to provide between about 0.2 and 30, and preferably between about 0.5 to 5, moles of oxygen per mole of sulfide ion used in the process. This treatment should provide between about 0.05 and 0.9, and preferably between about 0.1 and 0.8, mole of dissolved oxygen per mole of sulfide ion used in the process.

Dissolved oxygen represents that portion of the oxygen contained in the gas used to treat the reaction mixture which dissolves in the reaction mixture. The quantity of dissolved oxygen can be determined by measuring the difference between the quantity of oxygen fed to the reaction mixture and that discharged from the reaction mixture, using such illustrative known analytical procedures as gas chromatography and Orsat analysis.

The temperature at which the process is practiced is not critical and typically ranges from about 35° F. to 200° F. and preferably about 60° F. to 140° F. In a preferred embodiment no temperature adjustment is made between the sulfide treatment and the treatment with the oxygen-containing gas.

The choice of (i) sulfiding agent (ii) sulfide to cobalt ratio for sulfiding (iii) the ammonium hydroxide and ammonium carbonate concentrations in the liquor, and (iv) the nickel and cobalt concentrations in the liquor represent matters known to those skilled in the art and need not be repeated herein.

The mechanism by which the process of this invention reduces the amount of nickel precipitated in the mixed nickel-cobalt sulfide is not clearly understood. However, it is believed that the treatment of liquor with an oxygen-containing gas substantially halts the sulfiding reaction at the point where cobalt precipitation is substantially completed. Applicants, of course, do not intend to be bound by any theory of operation, but merely offer such theory as a possible explanation.

In carrying out the process of this invention, sulfide ions from any suitable source such as hydrogen sulfide or a variety of other known reagents are added to the ammoniacal carbonate solution containing the dissolved nickel and cobalt. The sulfide ions react with the nickel and cobalt to produce a precipitate comprising a mixture of nickel sulfide and cobalt sulfide. The solids are then ordinarily separated from the liquid phase. The treatment of the reaction mixture with oxygen-containing gas can be carried out either before, during or after this separation step. Of course, if the treatment occurs after the separation step, it is the liquid phase alone which is treated.

The process of this invention is preferably practiced on a continuous basis wherein the reaction mixture is treated with oxygen-containing gas prior to removal therefrom of the precipitated nickel and cobalt sulfide.

Selective dissolution of nickel sulfide from the cobalt sulfide-nickel sulfide precipitate The treatment of the mixed nickel sulfide-cobalt sulfide slurry with an oxygen-containing gas is performed after the sulfiding operation is completed and a slurry containing a solid phase of the mixed nickel sulfide-cobalt sulfide has been formed. The slurry is thickened using conventional techniques such as, for example, centrifuging or settling in thickening vessels, from an illustrative solids content of about 0.01% to about 0.5% by weight to an illustrative solids content of about .75% to about 10% by weight.

The amount of oxygen-containing gas used can vary widely and need only be an amount effective to selectively dissolve the nickel sulfide. Generally, however, the amount of gas used should be sufficient to provide between 0.1 and 10, and preferably between 0.2 and 5, moles of oxygen per mole of nickel contained in the solid phase of the thickened slurry. This treatment should provide between about 0.1 and 1.5, and preferably between about 0.2 and 0.6, mole of dissolved oxygen per mole of nickel contained in the solid phase of the thickened slurry.

Dissolved oxygen represents that portion of the oxygen contained in the gas used to treat the slurry which dissolves in the slurry. The quantity of dissolved oxygen can be determined by measuring the difference between the quantity of oxygen fed to the slurry and that discharged from the slurry using such illustrative known analytical procedures as gas chromatography and Orsat analysis.

The temperature at which the process is practiced is not critical. Lower temperatures tend to favor high selectivity. Illustrative temperatures range from about 35° F. to about 200° F., and preferably from about 60° F. to about 140° F. The process can be carried out on either a batch or a continuous basis.

The mechanism by which the process of this invention selectively solubilizes the nickel contained in the thickened nickel sulfide-cobalt sulfide slurry is not clearly understood.

The gas treated thickened slurry is then separated into a nickel enriched liquid phase and a cobalt enriched solid phase, using conventional techniques such as, for example, centrifugation or filtration. These separated fractions are then treated in accord with prior art procedures to recover the separated nickel and cobalt metal values contained therein.

The selective dissolution of the nickel sulfide can be advantageously employed either with nickel sulfide-cobalt sulfide mixed precipitates prepared in accordance with the selective precipitation aspects of this invention, or to such precipitates prepared by any of the prior art sulfiding operations.

In the case of both selective precipitation of cobalt sulfide and selective dissolution of nickel sulfide, air represents a preferred oxygen-containing gas, although pure oxygen, or oxygen dispersed in a suitable carrier gas is likewise effective as a treatment gas. The means by which the gas is brought into contact with the ammoniacal carbonate solution after addition of sulfiding agent is completed, or with the thickened ammoniacal carbonate slurry containing the mixed nickel sulfide-cobalt sulfide solid phase, is not critical although it is desirable to provide intimate contacting and mixing of the gas with either the solution or the slurry. Thus, any conventional mixing equipment which provides sufficient gas-liquid contact between gas and solution or slurry such as, for example, packed towers, sparger vessels, in-line mixers and the like can be used in the practice of this invention.

The following examples are provided to further illustrate the invention. Examples 1 to 3 illustrate the selective precipitation of cobalt sulfide while Examples 4 to 7 illustrate the selective dissolution of the nickel sulfide from the mixed sulfide precipitate.

EXAMPLE 1

A stock solution containing 9 grams per liter of nickel, 0.45 gram per liter of cobalt, 70 grams per liter of total ammonia (expressed as $NH_3$) and 89 grams per liter of carbonate (expressed as $CO_3^=$) was prepared and used in several of the examples described hereinbelow, as indicated.

A control test was run by placing 500 milliliters of stock solution in a stirred reactor to which hydrogen sulfide was then added as the sulfiding agent. About 30 minutes after completion of the addition of hydrogen sulfide, using a 4:1 molar ratio of sulfide to cobalt, the suspension was filtered. The residual cobalt concentration in the filtrate was about 0.01 gram per liter and the nickel concentration was about 7.8 grams per liter. The mixed nickel-cobalt sulfide contained 25.8% nickel and 9.8% cobalt.

The procedure was then repeated except that immediately after completion of the hydrogen sulfide addition, the suspension was treated with air. The air treatment was conducted by bubbling 1 liter of air per minute for thirty seconds through the suspension in the agitated reactor. This air treatment provided about 0.2 mole of dissolved oxygen per mole of sulfide used. The suspension was filtered 30 minutes after hydrogen sulfide addition. The residual cobalt concentration in the filtrate was about 0.01 gram per liter and the nickel concentration was about 8.3 grams per liter. The mixed nickel-cobalt sulfide contained 17.4% nickel and 11.6% cobalt. Thus, in comparison with the control, the precipitate contained about 18.6% more cobalt and about 32.6% less nickel indicating that substantially less nickel precipitated from solution when the air treatment was used; the nickel concentration in the filtrate had increased about 7%.

EXAMPLE 2

A control test was run, in a continuous flow mode, by feeding the stock solution described in Example 1 at a rate of 250 milliliters per minute into an in-line gas-liquid contactor. Hydrogen sulfide was metered continuously into this reactor to provide a 4:1 molar ratio of sulfide to cobalt. The resulting suspension was stored for 24 hours and then filtered. The filtrate contained about 0.02 gram per liter of cobalt and about 7.9 grams per liter of nickel. The solids contained about 23.0 percent by weight of nickel and 8.6 percent of cobalt.

The procedure was then repeated except that about 2 minutes after the addition of hydrogen sulfide was completed, the suspension was treated with air in a second in-line gas-liquid contactor. About 500 milliliters of air per minute were metered into the slurry. This air treatment provided about 0.4 mole of dissolved oxygen per mole of sulfide used. The suspension was stored for 24 hours and then filtered. The filtrate contained about 0.02 gram per liter of cobalt and about 8.4 grams per liter of nickel. The solids contained about 16.3 percent of nickel and 11.2% of cobalt. Thus, in comparison with the control, the precipitate contained about 30.2% more cobalt and about 29% less nickel, again showing that substantially less nickel precipitated from solution in the case where the solution was treated with air; the nickel concentration in the filtrate had increased almost 7%.

EXAMPLE 3

A control test was run by placing 500 milliliters of the stock solution described in Example 1 in a stirred reactor and subjecting it to hydrogen sulfide treatment using a 4:1 molar ratio of sulfide to cobalt. Ten minutes after the hydrogen sulfide treatment was completed, the suspension was filtered. Although the cobalt content of the filtrate was only about 0.01 gram per liter, visual observations indicated that metal sulfide precipitation in the filtrate continued.

The procedure was then repeated except that immediately after the filtration operation, the liquid phase was treated with air at a rate of 1 liter of air per minute for thirty seconds. This air treatment provided about 0.2 mole of dissolved oxygen per mole of sulfide used. The air-liquid contact was conducted in an agitated vessel. In contrast to the control, no further precipitation of metal sulfides was visually apparent in the aerated filtrate indicating that treatment with air produced a substantial arresting of precipitation in the nickel enriched filtrate.

EXAMPLE 4

A solution containing 12.6 grams per liter of nickel, 0.42 gram per liter of cobalt, 70 grams per liter of total ammonia (expressed as $NH_3$) and 88 grams per liter carbonate (expressed as $CO_3^=$) was treated with hydrogen sulfide gas. The resulting sulfided slurry, containing approximately 0.2% solids, was allowed to settle in a thickening vessel. The thickened reaction mixture was withdrawn from the bottom of the settling vessel. Analysis of this slurry indicated a solid level of 4.2%. The liquid phase contained 10.35 grams per liter of nickel and .015 gram per liter of cobalt. The solid sulfide phase analyzed 38.6% nickel and 11.5% cobalt.

Fifty gallons of the thickened slurry were placed in a stirred (140 r.p.m.) vessel and heated to 110° F. by means of an indirect heat exchanger. To this vessel, air was added by means of a stainless steel frit at the rate of 0.5 standard cubic feet a minute (s.c.f.m.). After four hours of treatment, the slurry consisted of an aqueous phase containing 15.15 grams per liter of nickel and .017 gram per liter of cobalt and a solid sulfide phase containing 35.8% nickel and 14.1% cobalt. In comparison to the untreated slurry, this corresponds to about a 46% increase in the nickel content of the aqueous phase of the slurry, and a 7% decrease in nickel content and a 12.3% increase in cobalt content of the solid phase of the slurry. This air treatment provided about 0.3 mole of dissolved oxygen per mole of nickel contained in the solid phase of the thickened slurry.

After eight hours of treatment of the same initial slurry, analysis indicated a liquid ammoniacal carbonate aqueous phase containing 17.17 grams per liter of nickel and .040 gram per liter of cobalt and a solid sulfide phase containing 33.3% nickel and 16.65% cobalt. Thus, in comparison to the untreated slurry, treatment under these conditions produced about a 66% increase in the nickel content of the aqueous phase of the slurry, and a 14% decrease in nickel content and a 45% increase in cobalt content in the solid phase of the slurry. This air treatment provided about 0.6 mole of dissolved oxygen per mole of nickel contained in the solid phase of the thickened slurry.

EXAMPLE 5

Fifty gallons of the thickened, mixed nickel sulfide-cobalt sulfide slurry described in Example 4 were placed in a stirred (140 r.p.m.) vessel and heated to 90° F. To this vessel, air was added by means of a stainless steel frit at the rate of 0.5 s.c.f.m.

After four hours of treatment, analysis of the slurry showed a liquid ammoniacal carbonate aqueous phase containing 15.22 grams per liter of nickel and .018 gram per liter of cobalt; the solid sulfide phase contained 35.19% nickel and 14.8% cobalt. This air treatment provided about 0.3 mole of dissolved oxygen per mole of nickel contained in the solid phase of the thickened slurry.

After eight hours of treatment, analysis of the treated slurry showed a liquid ammoniacal carbonate aqueous phase containing 17.04 grams per liter nickel and 0.032 gram per liter cobalt; the solid sulfide phase contained 33.3% nickel and 16.65% cobalt. This air treatment provided about 0.6 mole of dissolved oxygen per mole of nickel contained in the solid phase of the thickened slurry.

Results for both treatment times corresponded closely with those observed for the equivalent treatment times in Example 4.

EXAMPLE 6

A thickened, mixed nickel sulfide-cobalt sulfide slurry was prepared in a manner similar to that described in Example 4. The thickened slurry, which contained 3.0% solids, was analyzed and found to contain 9.39 grams per liter nickel and .015 gram per liter cobalt in the liquid phase and 39.57% nickel and 10.40% cobalt in the solid phase. Fifty gallons of the thickened slurry were placed in a stirred (140 r.p.m.) vessel and heated to 110° F. To this vessel, air was added by means of a stainless steel frit at the rate of 1.0 s.c.f.m.

After two hours of treatment, analysis of the slurry showed a liquid ammoniacal carbonate aqueous phase containing 12.6 grams per liter of nickel and 0.017 gram per liter of cobalt; the solid phase contained 36.1% nickel and 13.89% cobalt. In comparison to the untreated slurry, this corresponded to about a 35% increase in the nickel content of the aqueous phase of the slurry, and a 5% decrease in nickel content and a 13% increase in cobalt content of the solid phase of the slurry. This air treatment provided about 0.3 mole of dissolved oxygen per mole of nickel contained in the solid phase of the thickened slurry.

After four hours of treatment, the liquid ammoniacal carbonate aqueous phase contained 14.70 grams per liter nickel and .069 gram per liter cobalt; the solids sulfide phase contained 32.98% nickel and 16.98% cobalt. Thus, in comparison to the untreated slurry, treatment under these conditions produced about a 57% increase in the nickel content of the aqueous phase of the slurry, and a 17% decrease in nickel content and a 63% increase in cobalt content in the solid phase of the slurry. This air treatment provided about 0.6 mole of dissolved oxygen per mole of nickel contained in the solid phase of the thickened slurry.

EXAMPLE 7

A thickened, mixed nickel sulfide-cobalt sulfide slurry was prepared in a manner similar to that described in Example 4. The thickened slurry, which contained 3.0% solids, was analyzed and found to contain 8.93 grams per liter nickel and 0.022 gram per liter cobalt in the liquid phase and 39.59% nickel and 8.70% cobalt in the solid phase. This slurry was then treated with air in a continuous mode by feeding the slurry into a stirred (140 r.p.m.) heated (110° F.), 170 gallon vessel for continuous aeration. Nominal retention time in the vessel was about 2.8 hours. Analysis of the treated slurry leaving the aeration vessel over a four-hour treatment period showed a liquid ammoniacal carbonate aqueous phase containing 13.79 grams per liter nickel and 0.023 gram per liter cobalt; the solid phase contained 36.9% nickel and 13.02% cobalt. Thus, in comparison to the untreated slurry, the treatment in this continuous mode produced about a 55% increase in the nickel content of the aqueous slurry, and a 65% decrease in nickel content and a 50% increase in cobalt content in the solid phase of the slurry. This air treatment provided about 0.5 mole of dissolved oxygen per mole of nickel contained in the solid phase of the thickened slurry.

The examples and other detailed descriptions presented hereinabove are illustrative only and such alterations and modifications thereof as would be apparent to one skilled in the art are deemed to fall within the scope and spirit of the claims appended hereto.

What is claimed is:

1. In a process for recovering cobalt from an ammoniacal carbonate solution containing dissolved therein cobalt and nickel, comprising treating said solution with a sulfiding agent which will provide sulfide ions in said solution in sufficient amount to precipitate cobalt sulfide and nickel sulfide, thereby forming an ammoniacal carbonate slurry in which the solid phase comprises a mixture of cobalt sulfide and nickel sulfide, the improvement for selectively dissolving the precipitated nickel sulfide in the liquid phase of the slurry after precipitation of the cobalt sulfide and nickel sulfide is completed which comprises:
   (a) thickening the slurry of precipitated cobalt sulfide and nickel sulfide after precipitation of the cobalt and nickel sulfide is completed and then
   (b) treating said thicked slurry, after precipitation of the cobalt and nickel sulfide is completed, with a gas containing elemental oxygen, said gas being employed in an amount effective to selectively dissolve said precipitated nickel sulfide in the liquid phase of the thickened slurry.

2. The process of claim 1 wherein said thickened slurry has a solids content of from about 0.75% to about 10% by weight.

3. The process of claim 2 wherein said gas is air.

4. The process of claim 1 wherein said gas is air.

5. The process of claim 1 wherein the amount of gas used is sufficient to provide between about 0.1 and 1.5 moles of dissolved oxygen per mole of nickel contained in the solid phase of the thickened slurry.

6. The process of claim 5 wherein between about 0.2 and about 0.6 mole of dissolved oxygen are employed.

7. In a process for recovering cobalt from an ammoniacal carbonate solution containing dissolved therein cobalt and nickel, comprising treating said solution with a sulfiding agent which will provide sulfide ions in said solution in sufficient amount to precipitate cobalt sulfide and nickel sulfide, thereby forming an ammoniacal carbonate slurry in which the solid phase comprises a mixture of cobalt sulfide and nickel sulfide, the improvement for selectively dissolving the precipitated nickel sulfide in the liquid phase of the slurry, after precipitation of the cobalt sulfide and nickel sulfide is completed, which comprises:
   (a) thickening the slurry of precipitated cobalt sulfide and nickel sulfide, after precipitation of the cobalt and nickel sulfide is completed, to a solids content of from about 0.75% to about 10% by weight and then
   (b) treating said thickened slurry, after precipitation of the cobalt and nickel sulfide is completed, with air in an amount sufficient to provide between about 0.1 and 1.5 moles of dissolved oxygen per mole of nickel contained in the solid phase of the thickened slurry to thereby selectively dissolve precipitated nickel sulfide in the liquid phase of the thickened slurry.

8. The process of claim 7 wherein between about 0.2 and about 0.6 mole of dissolved oxygen are employed.

9. In a process for recovering cobalt from an ammoniacal carbonate solution containing dissolved therein cobalt and nickel, comprising treating said solution with a sulfiding agent which will provide sulfide ions in said solution in sufficient amount to precipitate cobalt sulfide and nickel sulfide, thereby forming an ammoniacal carbonate slurry in which the solid phase comprises a mixture of cobalt sulfide and nickel sulfide, the improvement for selectively recovering a solid phase substantially enriched in cobalt values and a liquid phase substantially enriched in nickel values, which comprises:
   (a) treating said solution with a gas containing elemental oxygen after addition of sulfiding agent to the solution is completed, said gas being employed in an amount effective to reduce the amount of nickel sulfide co-precipitated with the cobalt sulfide;
   (b) thickening the resulting slurry of precipitated cobalt sulfide and nickel sulfide, after precipitation of the cobalt and nickel sulfide is completed; and
   (c) treating said thickened slurry, after precipitation of the cobalt and nickel sulfide is completed, with a gas containing elemental oxygen, said gas being employed in an amount effective to selectively dissolve said precipitated nickel sulfide in the liquid phase of the thickened slurry.

10. The process of claim 9 wherein the gas is air.

11. The process of claim 10 wherein said solution is treated with air at between about 2 and 30 minutes after addition of the sulfiding agent to the solution is completed and in an amount sufficient to provide between about 0.05 to 0.9 mole of dissolved oxygen per mole of sulfide ion added to said solution.

12. The process of claim 11 wherein said thickened slurry has a solids content of from about 0.75% to about 10% by weight and wherein said thickened slurry is treated with air in an amount sufficient to provide between about 0.1 to 1.5 moles of dissolved oxygen per mole of nickel contained in the solid phase of the thickened slurry.

References Cited
UNITED STATES PATENTS

| | | | |
|---|---|---|---|
| 2,913,334 | 11/1959 | Dean | 75—108 |
| 2,913,335 | 11/1959 | Dean | 75—108 |
| 2,588,265 | 3/1952 | McGauley | 75—119 |
| 2,971,835 | 2/1961 | Matson | 75—119 X |

HERBERT T. CARTER, Primary Examiner

U.S. Cl. X.R.

423—140; 75—103, 108, 119